United States Patent [19]

Morikawa

[11] Patent Number: 5,050,551

[45] Date of Patent: Sep. 24, 1991

[54] SYSTEM FOR CONTROLLING IGNITION TIMING AND FUEL INJECTION TIMING OF A TWO-CYCLE ENGINE

[75] Inventor: Koji Morikawa, Tokyo, Japan

[73] Assignee: Fuji Jukogyo Kabushiki Kaisha, Tokyo, Japan

[21] Appl. No.: 601,937

[22] Filed: Oct. 22, 1990

[30] Foreign Application Priority Data

Nov. 22, 1989 [JP] Japan ................................ 1-306079

[51] Int. Cl.$^5$ .......................... F02M 67/00; F02P 5/15
[52] U.S. Cl. ...................................... 123/305; 60/285; 123/73 C; 123/425; 123/435
[58] Field of Search ...................... 123/73 C, 295, 305, 123/425, 435, 440, 489; 60/274, 276, 284, 285

[56] References Cited

U.S. PATENT DOCUMENTS

| 3,799,134 | 3/1974 | Griese | 123/407 |
| 3,949,551 | 4/1976 | Eichler et al. | 60/285 X |
| 4,111,010 | 9/1978 | Minami | 60/285 X |
| 4,165,610 | 8/1979 | Iizuka et al. | 60/285 X |

FOREIGN PATENT DOCUMENTS 62-124211 8/1987 Japan .

Primary Examiner—Tony M. Argenbright
Attorney, Agent, or Firm—Martin A. Farber

[57] ABSTRACT

A temperature sensor is provided for detecting temperature of exhaust gas in an exhaust passage of a two-cycle engine. The temperature is compared with a reference temperature for activating a catalytic converter. When the temperature is lower than the reference temperature, the ignition timing and the fuel injection timing of the engine are retarded. The quantity of injected fuel is increased so as to compensate reduction of engine power caused by retarding the ignition timing.

3 Claims, 4 Drawing Sheets

FIG. 4
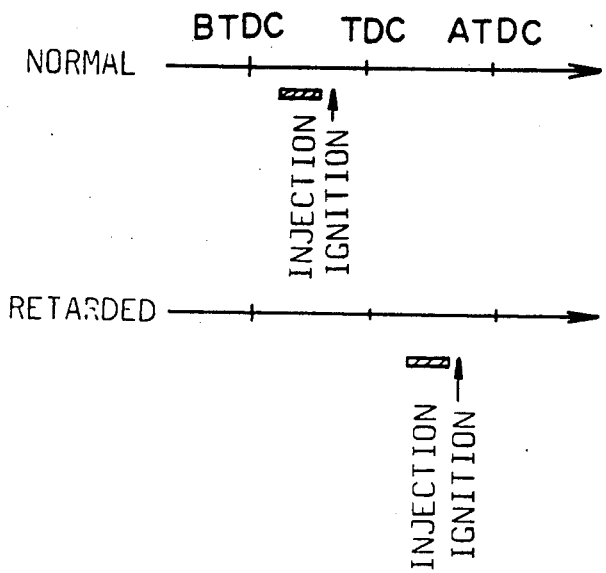
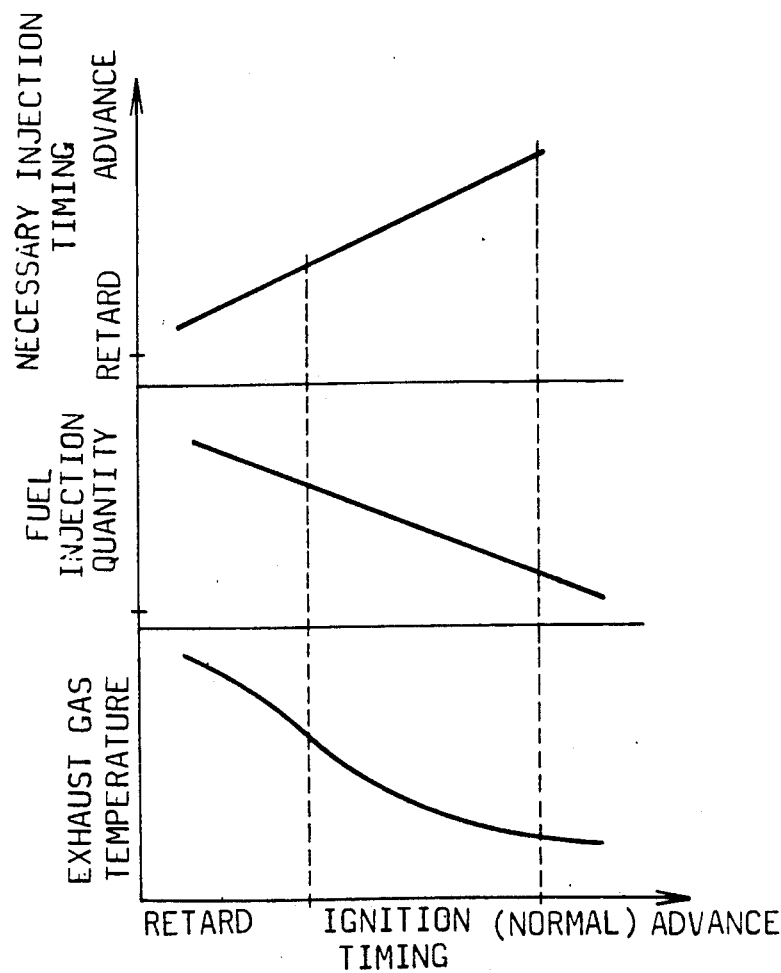

5,050,551

SYSTEM FOR CONTROLLING IGNITION TIMING AND FUEL INJECTION TIMING OF A TWO-CYCLE ENGINE

BACKGROUND OF THE INVENTION

The present invention relates to a system for controlling ignition timing and fuel injection timing of a two-cycle engine at cold state, and more particularly to a control system for the two-cycle engine having an exhaust emission control system with a catalytic converter.

In a four-cycle engine, temperature of exhaust gas is high comparing with that of the two-cycle engine, so that a catalyst in the catalytic converter provided in an exhaust pipe is sufficiently heated to be activated for ensuring exhaust emission control.

In the two-cycle engine, however, a part of intake air escapes from a cylinder through an exhaust port at scavenging the cylinder. Thus, the temperature of the exhaust gas is lowered. In particular, in a low engine speed range and a light load range, the catalyst is not heated to an activated temperature. As a result, the exhaust gas containing poisonous elements is emitted to atmosphere.

In order to maintain the activated temperature of the catalyst, it is proposed to provide the catalytic converter at an upper stream portion of the exhaust pipe so that the exhaust gas having a high temperature may pass through the catalytic converter.

However, since the temperature of the exhaust gas is high in a full load range, durability and function of the catalyst are reduced.

On the other hand, Japanese Utility Model Application Laid-Open 62-124211 discloses a catalytic converter in which a heater is provided at an inlet thereof. The heater is adapted to change a heating value thereof in dependency on the temperature. It is effective to increase the temperature of the catalyst to the activated temperature. However, it consumes a large electric power, and it is difficult to heat the whole catalyst. Further, it is necessary to provide a control unit for heating the heater.

SUMMARY OF THE INVENTION

The object of the present invention is to provide an exhaust emission control system for a two-cycle engine in which temperature for activating a catalyst is maintained, thereby ensuring to control exhaust gas emission.

According to the present invention, there is provided a system for controlling a two-cycle engine having at least one cylinder, a fuel injector provided for injecting fuel directly in the cylinder, a spark plug for igniting the fuel, and a catalytic converter in an exhaust passage for exhaust gas emission.

The system comprises a temperature sensor for detecting temperature of exhaust gas in the exhaust passage upstream of the catalytic converter, a comparator for comparing the temperature detected by the temperature sensor with a reference temperature for activating the catalytic converter and for producing a temperature signal when the detected temperature is lower than the reference temperature, retard quantity determining means responsive to the temperature signal for determining a retard quantity for the ignition timing and fuel injection timing, retarding means for retarding the ignition timing and the fuel injection timing based on the retard quantity, correcting means for increasing the quantity of injected fuel in accordance with the retard quantity so as to compensate reduction of engine power caused by retarding the ignition timing.

Since the ignition timing is retarded, the temperature of the exhaust gas increases, thereby activating the catalytic converter. Thus, the control of the exhaust gas emission can be performed, even if the exhaust gas temperature is lower than the temperature for activating the catalyst In an aspect of the invention, the reference temperature is a lower limit temperature for activating the catalytic converter, and the retard quantity is set to increase with an increase of the difference between the detected temperature and the reference temperature.

These and other objects and features of this invention will become understood from the following description with reference to the accompanying drawings.

BRIEF DESCRIPTION OF DRAWINGS

FIG. 4 is a time chart showing fuel injection and ignition timings; and

FIGS. 5a to 5c are graphs showing variations of fuel injection, injection timing and exhaust gas temperature in accordance with the ignition timing.

DETAILED DESCRIPTION OF THE PREFERRED EMBODIMENT

Figure 1:
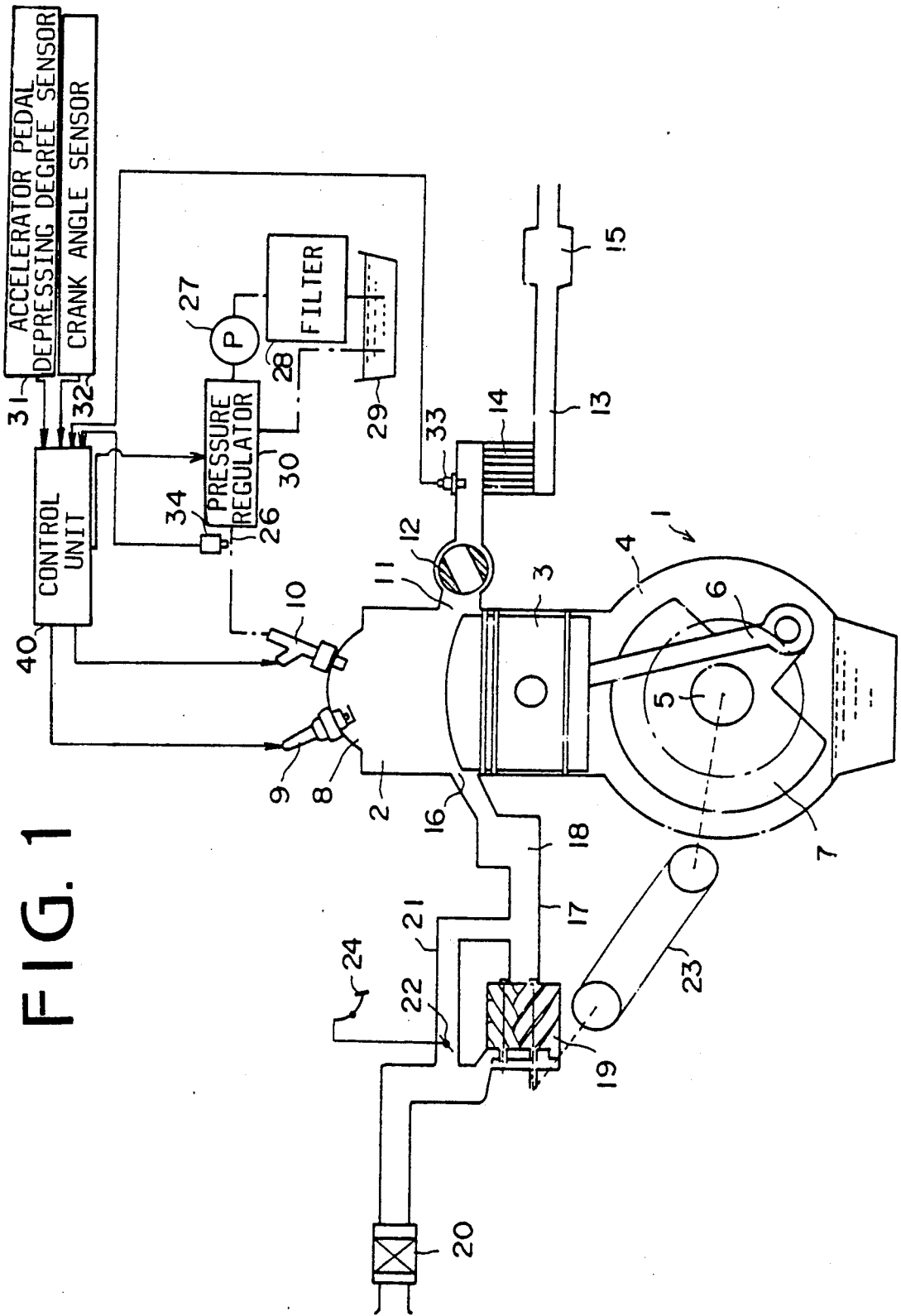
FIG. 1 is a schematic diagram of a two-cycle engine of the present invention.

Referring to FIG. 1, a two-cycle engine 1 comprises a cylinder 2, a piston 3 provided in the cylinder 2, a connecting rod 6 connected with the piston 3 and a crankshaft 5 disposed in a crankcase 4. A counterweight 7 is mounted on the crankshaft 5 so as to reduce inertia of the piston 3 reciprocating in the cylinder 2.

In a wall of the cylinder 2, an exhaust port 11 and a scavenge port 16 are formed in 90 degrees angular disposition or opposing one another. The ports 11 and 16 are adapted to open at a predetermined timing with respect to a position of the piston 3.

A fuel injector 10 and a spark plug 9 are provided on a top of a combustion chamber 8 of the cylinder 2. The injector 10 is a type where a predetermined amount of fuel is directly injected in the cylinder and the quantity of the fuel is controlled with the injection pulse width. The fuel in a fuel tank 29 is supplied to the injector 10 through a fuel passage 26 having a filter 28, a pump 27 and a pressure regulator 30 for constantly maintaining the fuel at a predetermined fuel pressure.

The engine 1 is supplied with air through an air cleaner 20, a displacement scavenge pump 19, and an intake pipe 17 having a scavenge chamber 18 for absorbing scavenge pressure waves when the scavenge port 16 is opened or closed. A bypass 21 is provided around the scavenge pump 19. The bypass 21 is provided with a control valve 22. Exhaust gas of the engine 1 is discharged passing through the exhaust port 11, a rotary valve provided adjacent the exhaust port 11 in an exhaust pipe 13 having a catalytic converter 14 for controlling the exhaust gas emission, and a muffler 15.

The scavenge pump 19 is operatively connected to the crankshaft 5 through a transmitting device 23 comprising an endless belt running over a crank pulley and a pump pulley. The scavenge pump 19 is driven by the crankshaft 5 through the transmitting device 23 for producing a scavenge pressure. An accelerator pedal 24 is operatively connected with the control valve 22. An opening degree of the control valve 22 is controlled so as to be inversely proportional to the depressing degree of the accelerator pedal 24. Further, an accelerator pedal depressing degree sensor 31 and a crank angle sensor 32 are provided for determining engine operating conditions. An exhaust gas temperature sensor 33 is provided upstream of the catalytic converter 14 for detecting temperature of the exhaust gas. In addition, a pressure sensor 34 is provided in the fuel passage 26 downstream of the pressure regulator 30 for detecting a pressure of the fuel to be injected.

Output signals from the sensors 31, 32, 33 and 34 are supplied to a control unit 40 which feeds an ignition signal and a fuel injection pulse signal to the spark plug 9 and the injector 10, respectively.

Figure 2:
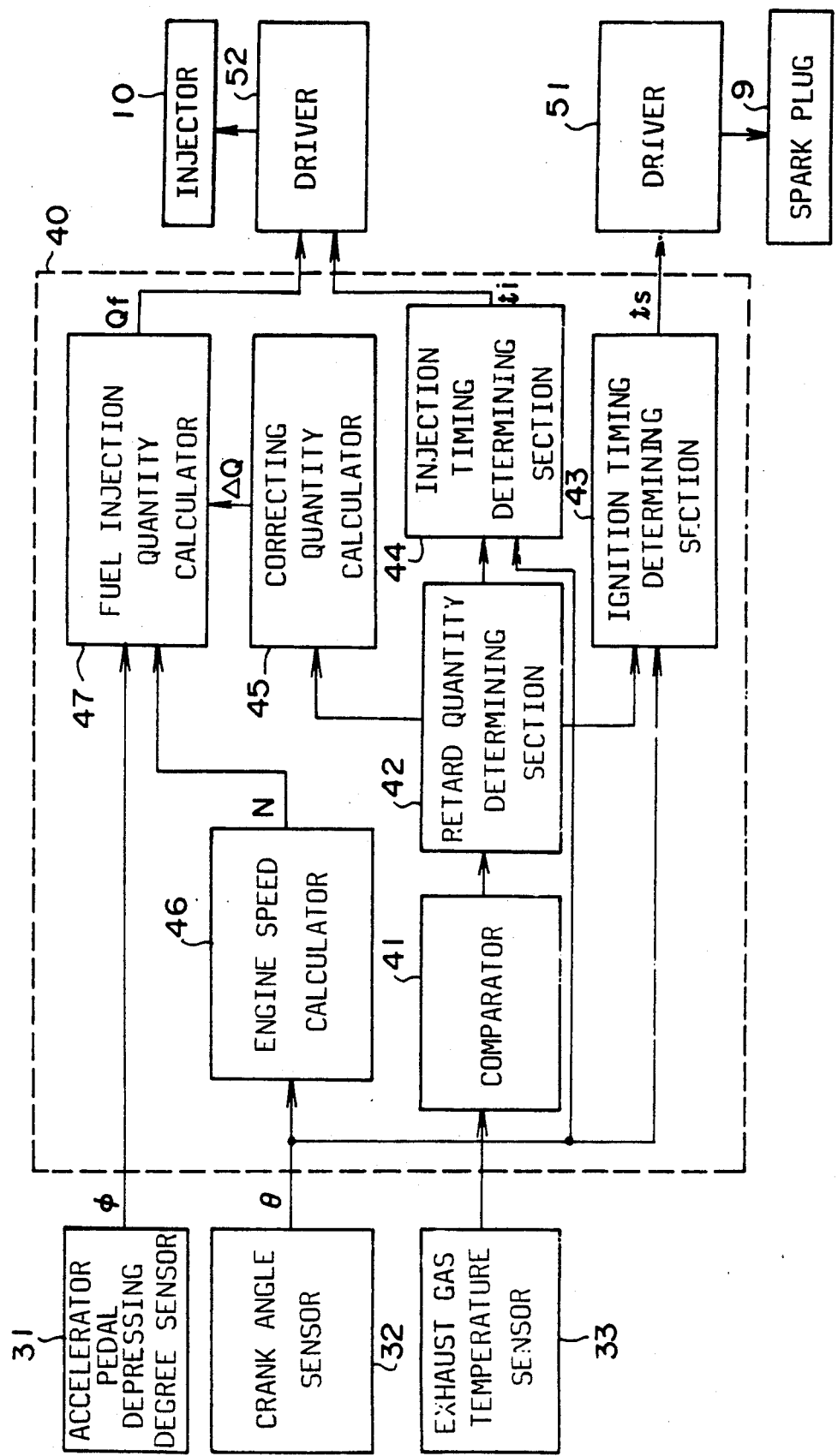
FIG. 2 is a block diagram showing a control unit according to the present invention.

Referring to FIG. 2, the control unit 40 comprises an engine speed calculator 46 to which a crank angle $\theta$ detected by the crank angle sensor 32 is applied for calculating engine speed N. The engine speed N and an accelerator pedal depressing degree $\phi$ detected by the accelerator pedal depressing degree sensor 31 are applied to a fuel injection quantity calculator 47. The crank angle $\theta$ is further applied to an ignition timing determining section 43 and a fuel injection timing determining section 44, respectively.

The control unit 40 is further provided with a comparator 41 to which an output signal of exhaust temperature detected by the exhaust temperature sensor 33 is applied. In the comparator 41, a lower limit temperature for activating a catalyst in the catalytic converter 14 is previously provided. The exhaust temperature is compared with the lower limit temperature. If the exhaust temperature is lower than the lower limit temperature, the comparator 41 produces an output signal which is applied to an ignition/injection timing retard quantity determining section 42. In the section 42, quantity for retarding the ignition timing and for retarding the fuel injection timing are determined. The retard quantity is determined in accordance with the difference between the exhaust temperature and the lower limit temperature. If the difference is large, the retard quantity becomes large. However, the maximum retard value is determined. The retard quantity is applied to the ignition timing determining section 43 in which an ignition timing ts is determined. The ignition timing ts is applied to the spark plug 9 through a driver 51. The retard quantity is also applied to the fuel injection timing determining section 44 in which a fuel injection timing ti is determined. The fuel injection timing ti is applied to the injector 10 through a driver 52.

Since the ignition timing is retarded, the power of the engine is reduced. In order to compensate the reduction of the engine power, the quantity of fuel injected from the injector 10 is increased. To this end, the control unit 40 is provided with a correcting injection quantity calculator 45 to which the retard quantity determined in the section 42 is applied for calculating a correcting injection quantity $\Delta Q$. The correcting injection quantity $\Delta Q$ is applied to the fuel injection quantity calculator 47 where a corrected fuel injection quantity Qf is calculated. The fuel injection quantity Qf is applied to the fuel injector 10 through the driver 52 at the retarded injection timing ti.

Figure 3:
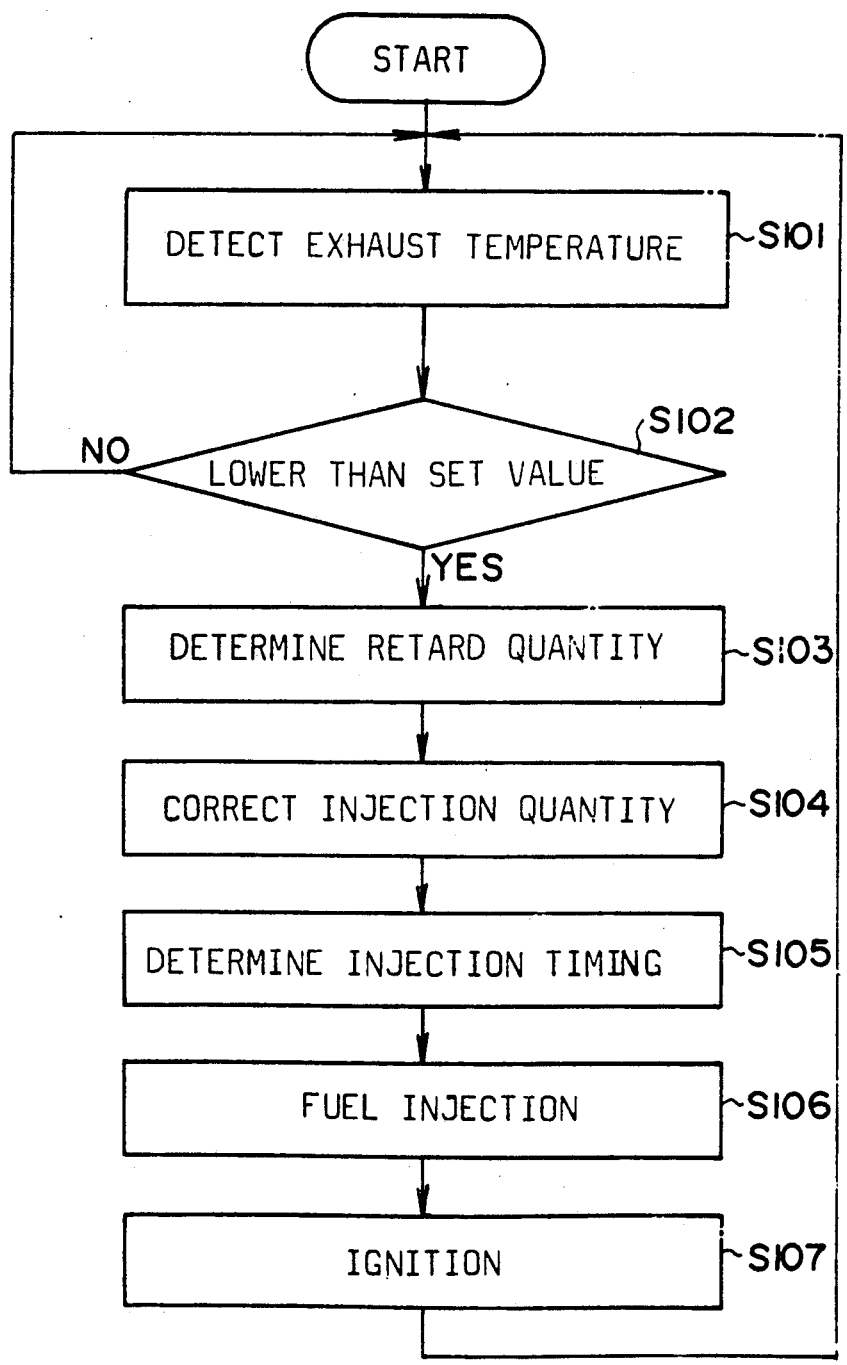
FIG. 3 is a flowchart showing operations of the system.

The operation of the system will be described herein after with reference to the flowchart of FIG. 3.

When the engine starts, the temperature of the exhaust gas is detected at a step S101. At a step S102, the exhaust gas temperature is compared with the predetermined lower limit temperature of the temperature of the activated catalyst. If the exhaust gas temperature is lower than the lower limit, the program goes to a step S103. If not, the program returns to step S101.

At the step S103, the retard quantity of the ignition timing and the fuel injection timing is determined. At a step S104, the fuel injection quantity is corrected based on the retard quantity. At a step S105, the fuel injection timing is determined. At a step S106, a predetermined increased quantity of fuel is injected from the injector 10. At a step S107, ignition is performed by the spark plug 9.

In a normal engine operation, the fuel injection timing ti and ignition timing ts are determined at a proper interval before top dead center as shown in FIG. 4, so that charge stratification may be performed in the combustion. When the exhaust gas temperature is lower than the lower limit of the temperature of the activated catalyst, the timings ts and ti are retarded. The timings ts and ti are determined at a proper interval after top dead center. When the exhaust gas temperature rises and exceeds the lower limit temperature, the correcting operation to retard the timings is cancelled and the correcting operation to increase the fuel injection quantity is stopped.

FIG. 5 shows variations of the fuel injection quantity, fuel injection timing and exhaust temperature corresponding to the ignition timing.

Although the exhaust gas temperature is detected in the above described embodiment of the present invention, temperature of the catalyst may be detected in stead of the exhaust gas temperature.

In accordance with the present invention, since the ignition timing is retarded, the temperature of the exhaust gas is increased, thereby activating the catalyst in the catalytic converter. Thus, the control of the exhaust emission can be performed, even if the exhaust gas temperature is lower than the temperature for activating the catalyst.

The fuel injection quantity is increased when the ignition timing is retarded, so that the power of the engine is prevented from reducing. Since the quantity for retarding the ignition timing is determined in accordance with the lower limit of the temperature for activating the catalyst, the increase of the fuel consumption caused by an excess of retardation is avoided.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling a two-cycle engine having at least one cylinder, a fuel injector provided for injecting fuel directly in the cylinder, a spark plug for igniting the air fuel mixture, and a catalytic converter in an exhaust passage for exhaust gas emission, the system comprising:

a temperature sensor for detecting temperature of exhaust gas in the exhaust passage upstream of said catalytic converter;

a comparator for comparing the temperature with a reference temperature for activating said catalytic converter and for producing a temperature signal when the temperature is lower than the reference temperature;

retard quantity determining means responsive to said temperature signal for determining a retard quantity for the ignition timing and fuel injection timing;

retarding means for retarding the ignition timing and the fuel injection timing based on said retard quantity; and correcting means for increasing quantity of injected fuel in accordance with said retard quantity so as to compensate reduction of engine power caused by retarding the ignition timing.

2. The system according to claim 1, wherein said reference temperature is a lower limit temperature for activating the catalytic converter.

3. The system according to claim 1, wherein said retard quantity is set to increase with an increase of the difference between the temperature and said reference temperature.

* * * * *